(12) United States Patent
Braun

(10) Patent No.: US 11,378,135 B2
(45) Date of Patent: Jul. 5, 2022

(54) GEARED UNIVERSAL JOINT 90°

(71) Applicant: Jürgen Braun, Neustetten (DE)

(72) Inventor: Jürgen Braun, Neustetten (DE)

( * ) Notice: Subject to any disclaimer, the term of this patent is extended or adjusted under 35 U.S.C. 154(b) by 759 days.

(21) Appl. No.: 16/021,416

(22) Filed: Jun. 28, 2018

(65) Prior Publication Data

US 2019/0186549 A1   Jun. 20, 2019

(30) Foreign Application Priority Data

Dec. 15, 2017   (DE) .......................... 10 2017-011608

(51) Int. Cl.
    *F16D 3/30*   (2006.01)
    *F16H 1/00*   (2006.01)
    *F16D 3/38*   (2006.01)

(52) U.S. Cl.
    CPC .............. *F16D 3/30* (2013.01); *F16D 3/38* (2013.01); *F16H 1/006* (2013.01)

(58) Field of Classification Search
    CPC .............. F16D 3/30; F16D 3/38; F16H 1/006
    USPC ........................................................ 464/109
    See application file for complete search history.

(56) References Cited

U.S. PATENT DOCUMENTS

| 263,488 A | * | 8/1882 | Davis ........................... 464/109 |
| 912,096 A | | 2/1909 | Elkan |
| 1,196,268 A | | 8/1916 | Noel |
| 2,261,901 A | | 11/1941 | Erdman |
| 3,597,989 A | * | 8/1971 | Benson .................. F16H 1/006 |
| 4,721,493 A | | 1/1988 | Lane |
| 4,789,377 A | | 12/1988 | Hoskins |

FOREIGN PATENT DOCUMENTS

| DE | AS 1019131 B | 11/1957 |
| DE | 40 30 737 C2 | 9/1993 |
| DE | 44 10 377 A1 | 12/1994 |
| DE | 196 11 273 C1 | 9/1997 |
| FR | 2 529 278 A | * 12/1983 ................... 464/109 |

\* cited by examiner

*Primary Examiner* — Greg Binda
(74) *Attorney, Agent, or Firm* — Bacon & Thomas, PLLC

(57) ABSTRACT

Constant velocity joints or homokinetic joints are used for the continuous transmission of rotational movements and torques. They transmit the rotational movement of a driving shaft to a shaft to be driven without changing the speed or torque. The transmission takes place independently of the speed, torque, or the value of a diffraction angle and independently of the speed at which this diffraction angle changes. Constant velocity joints with a diffraction angle of 90° are equipped with specially shaped gear pairs, which are held together by a spring-loaded inner joint. In this joint transmission, a diffraction angle of 90° is achieved while the shafts to be connected to fixedly mounted bevel- and spur gear pairs are connected to each other, so that no spring-loaded inner joint is needed. Therefore, high engine speeds and high torques can be transmitted.

9 Claims, 6 Drawing Sheets

ISO - VIEW

SECTION A-A

ISO - VIEW

SECTION B-B

GEARED UNIVERSAL JOINT 90°

BACKGROUND

The invention relates to a 90-degree joint transmission. Constant velocity joints or homokinetic joints are used for the continuous transmission of rotational movements and torques. They transmit the rotational movement of a driving shaft to a shaft to be driven without changing the speed or torque. The transmission takes place independently of the speed, torque, or the value of a diffraction angle.

Constant velocity joints must be low in play, in order to be able to transmit accelerated or decelerated rotational movements without bumps. They should work with low maintenance and transmit non-destructively and positively, depending on the design, small or large torques, at high or low temperatures.

It is known for the fulfillment of the requirement, to transmit a rotational movement homokinetically and positively up to a diffraction angle of 90°, to use constant velocity joints with spur-circumferential-gearing, which are held together by an axially spring-loaded inner joint; according to DE 196 11 273 C1, wherein the inner joint is realized by a ball- and ball-socket-half. These halves are deflectably connected by two axially spring-loaded tension bolts in only one plane, which, at the sides facing the joint center, have the ball and the ball socket, respectively.

This has, for the consequence, that the diffraction angle of 90° can be achieved only in an aligned position between the ball and the ball socket and that the blockage of the bending movement occurs in the unfavorable position of the ball and ball socket. Depending on the diffraction angle, this joint is under variable spring tension, which increases with an increase in the diffraction angle, so that the joint tends to take a stretched position. Furthermore, at a high torque, the two geared joint halves can shift to each other as the result of axially springly-mounted tension bolts, whereby strong vibrations or the skipping of the teeth can occur.

The same applies to U.S. Pat. No. 912,096, where the joint halves are held together by two axially spring-loaded tension bolts, which have a hinge-like bearing at the sides facing the joint center. The disadvantage of this known joint is that it is not easy to bring it out of a stretched position to a flexed position because of only one-dimensional angularity.

Also, this joint is under variable spring tension, depending on the diffraction angle, which increases with an increase in the diffraction angle, so that the joint tends to take a stretched position.

From DE 40 30 737 C2, a constant velocity joint with the radii-gears is disclosed, in which the two joint halves are spring-loadedly held together via a loop-joint. This joint can be unrestrictedly deflected from a stretched position in any direction. The disadvantage here is that the two geared joint halves can shift to each other as the result of an axially spring-loaded tension bolt at a high torque, and that the joint is constantly striving to take a stretched position.

From the U.S. Pat. No. 4,721,493, a joint is disclosed, in which the joint halves are held together by a biasedly flexible wire. The disadvantage here is that the wire is subjected to a constant bending stress during the rotation of the flexed joint, and that the joint also strives to take a stretched position.

From DE-AS 1,019,131, a shaft joint having convex gear rims is disclosed, which are engaged with each other by pivotable and rotatable connection means. In this joint, the connection means are subjected to no constant tension, whereby the joint does not strive to move back from a flexed position to a stretched position. The disadvantage of this known joint is that it is not easy to bring it out of the stretched position into a flexed position because of the one-sided and one-dimensional angularity, and that in an unfavorable position or direction of the connecting means, there is even the blockage of the bending movement.

From DE 44 10 377 A1, a joint is disclosed, in which, the radii-gears are held in mutual engagement via a curve-controlled inner joint. This inner joint is also subjected to no constant tension and therefore does not strive to move back out of a flexed position into a stretched position. The disadvantage is that this joint cannot be used for small diffraction angles because it allows a length compensation only at a certain diffraction angle. Furthermore, the guide elements are expensive to manufacture and require short maintenance intervals.

The joint shown in U.S. Pat. No. 2,261,901 is held together via a hinge-like support, whereby only one-dimensional angularity can be achieved. The same applies to the joints disclosed in U.S. Pat. Nos. 4,789,377 and 1,196,268, where the angularity is also limited by an external device.

SUMMARY OF THE INVENTION

The invention is based on the object of providing a joint transmission, to transmit the continuous transmission of rotational movements and the torques of a driving shaft to an axially aligned or not axially aligned shaft to be driven up to a 90° diffraction angle, uniformly, positively and vibration-free, without changing the speed or torque and without striving to move back into a stretched position.

This object is achieved by the features described herein.

The advantages achieved by the invention are, in particular, to be able to transmit a uniform rotational movement up to 90° per joint transmission, wherein the diffraction angle per joint transmission can vary in any direction, and thus no tensile forces are necessary to hold the joint transmission together. Also, in two successively mounted joint transmissions, a uniform rotational movement with a diffraction angle of max. 180° can be achieved without paying attention to a parallelism between a driving side and a driven side.

As a connecting element for the two joint halves and as a holder for the employed spur- and bevel gears, two rotatably arranged joint forks, connected by 90° via a cross-axle, are employed, which are, by means of bearings, decoupled completely from a torque- and speed transmission by a drive-train. The torque and the speed are thus transmitted via the spur- and bevel gears and are arranged with the joint forks at their inner- and outer sides, in such a way that these can arbitrarily be flexed out of a stretched position into any desired direction of diffraction up to max. 90°. Since the torque- and speed transmission takes place via gearing, the connection element remains at the flexion of the joint transmission without co-rotation between the spur- and bevel gears on each bearing. This allows a smooth running of the employed spur- and bevel gears during the transmission of the torque at low and high speeds.

BRIEF DESCRIPTION OF THE DRAWINGS

Advantageous embodiments of the invention are shown in the following drawings and described in detail below. It shows.

DETAILED DESCRIPTION

Figure 1:
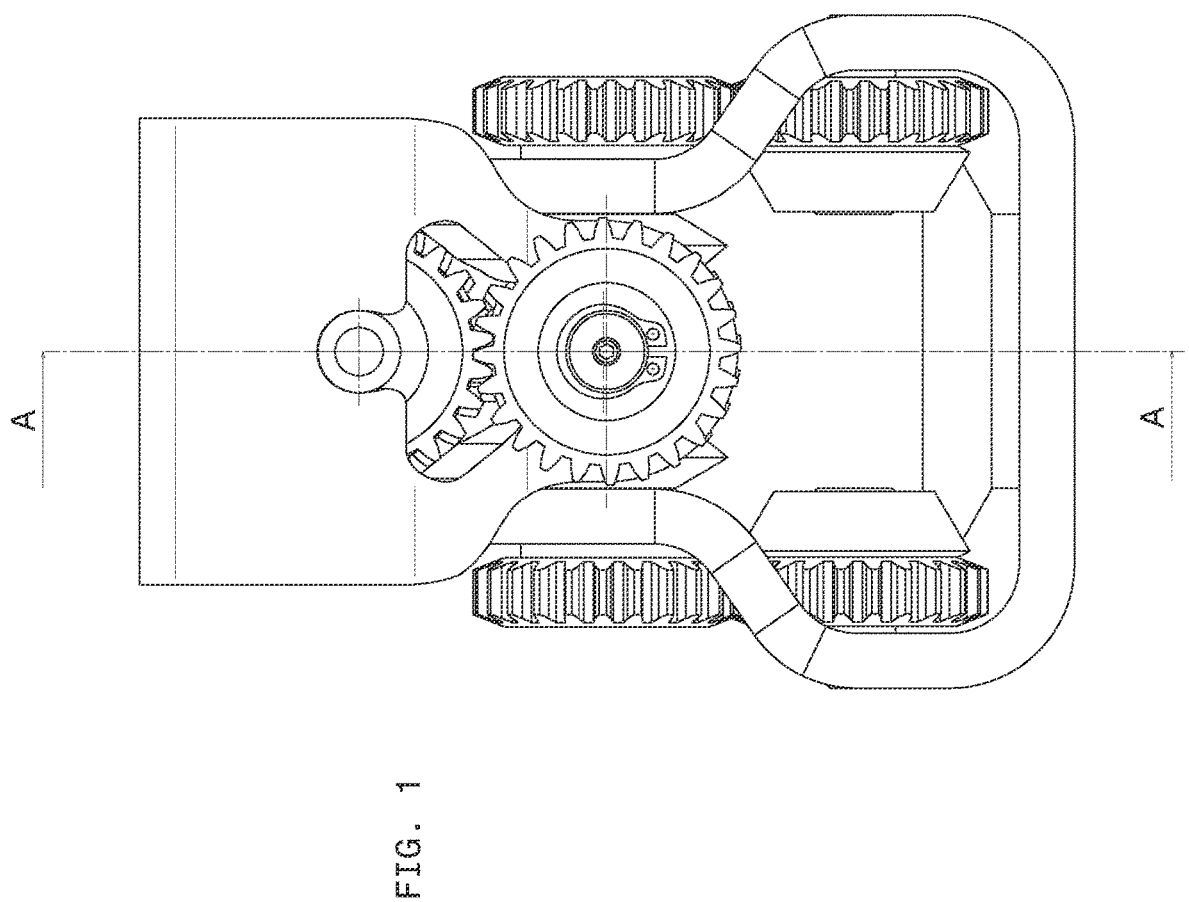
FIG. 1 is the front view of a 90°-joint transmission in the stretched position.
Figure 2:
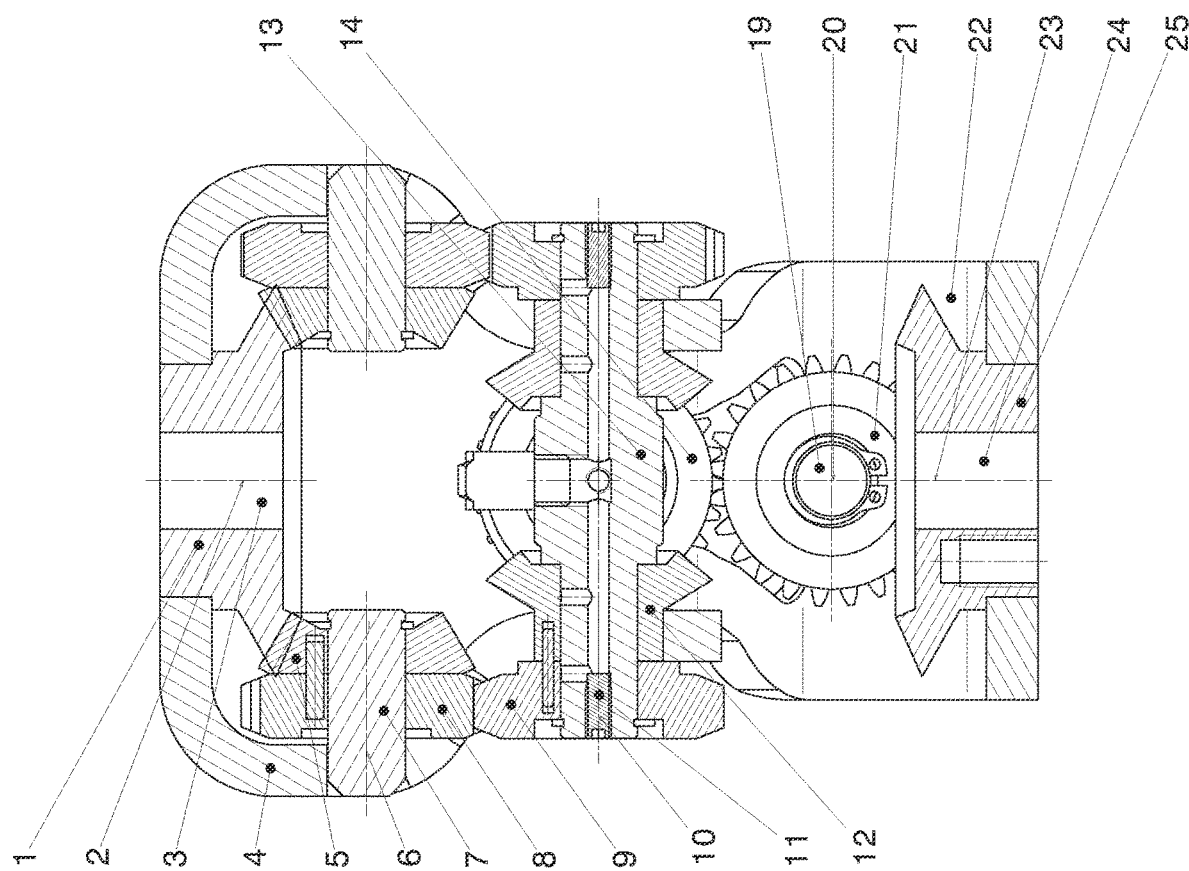
FIG. 2 is the section A-A of the 90°-joint transmission.
Figure 3:
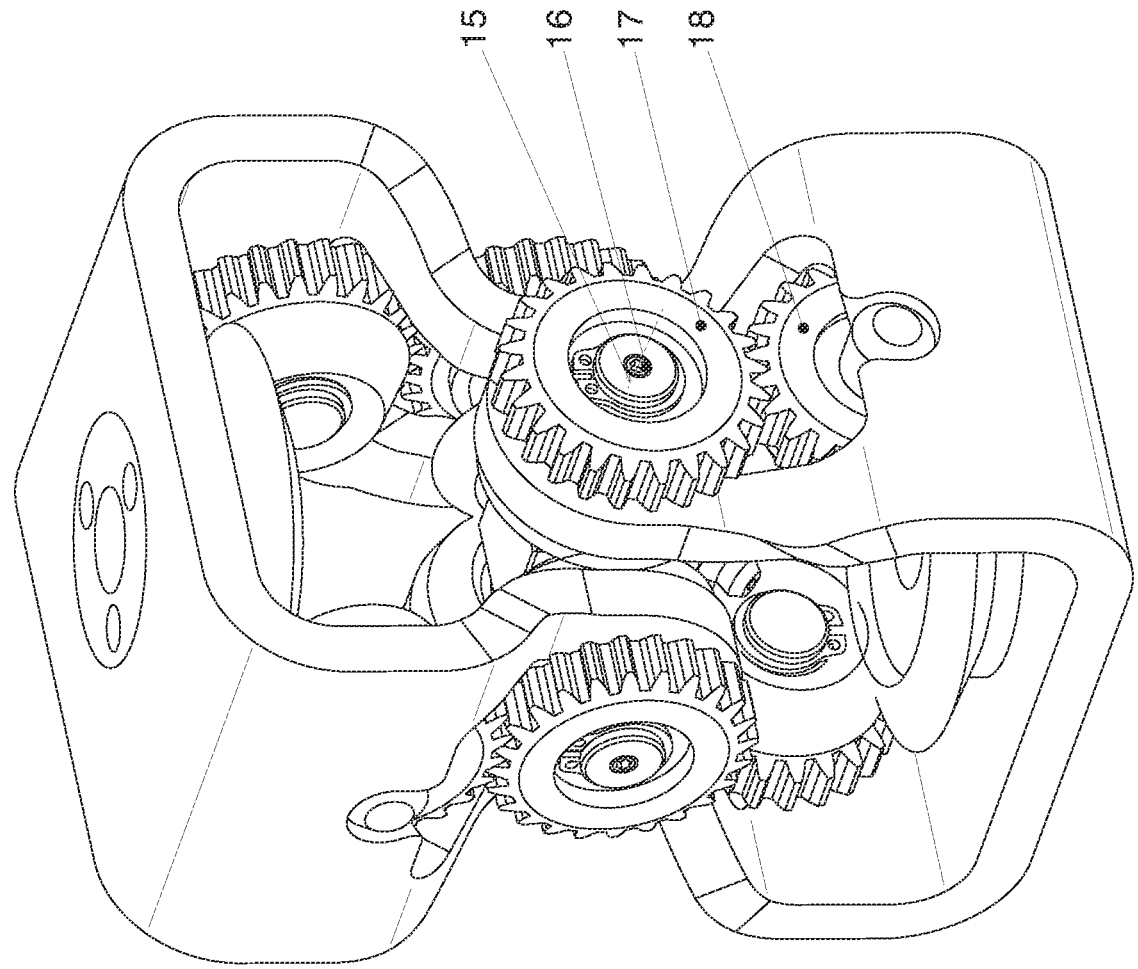
FIG. 3 is the isometric view of the 90°-joint transmission.
Figure 4:
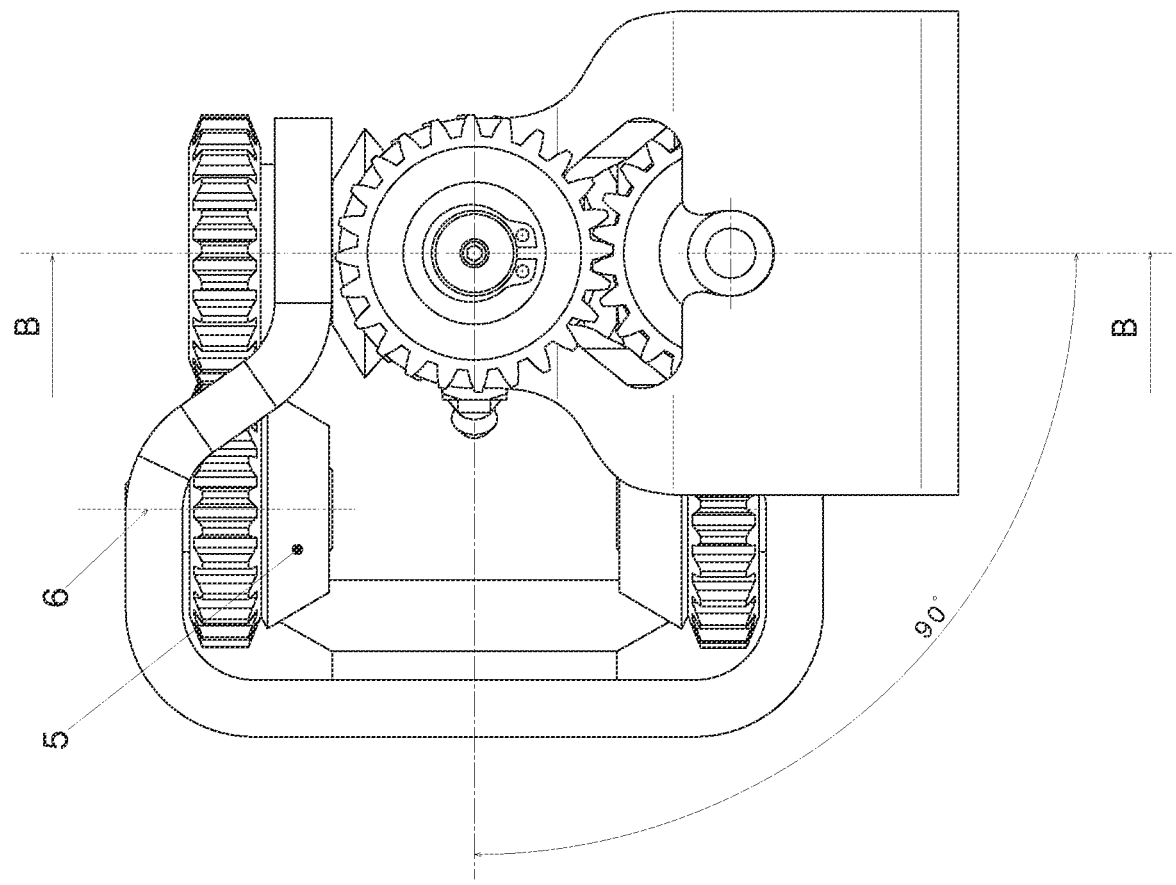
FIG. 4 is the front view of the 90°-joint transmission in the 90° position.
Figure 5:
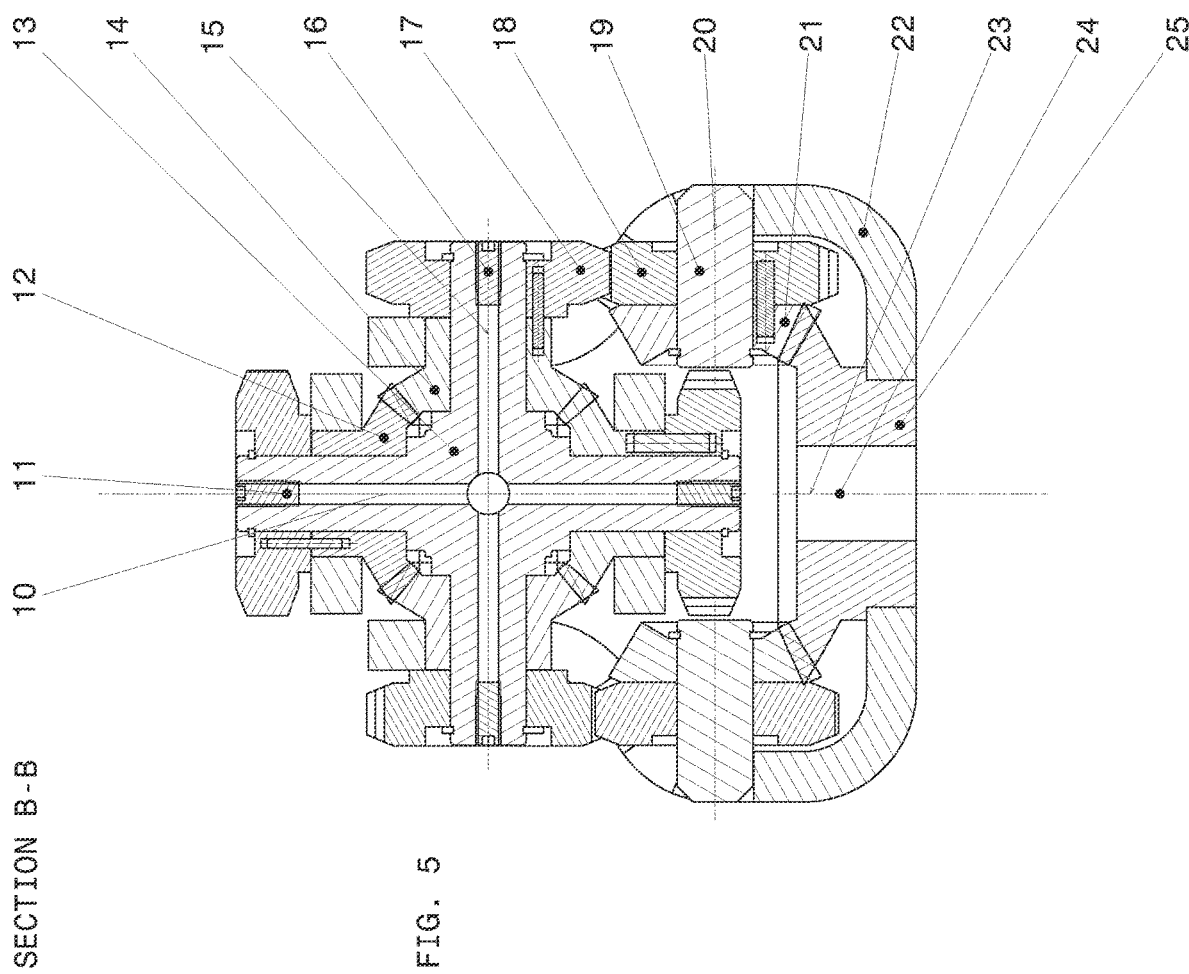
FIG. 5 is the section B-B of the 90°-joint transmission.
Figure 6:
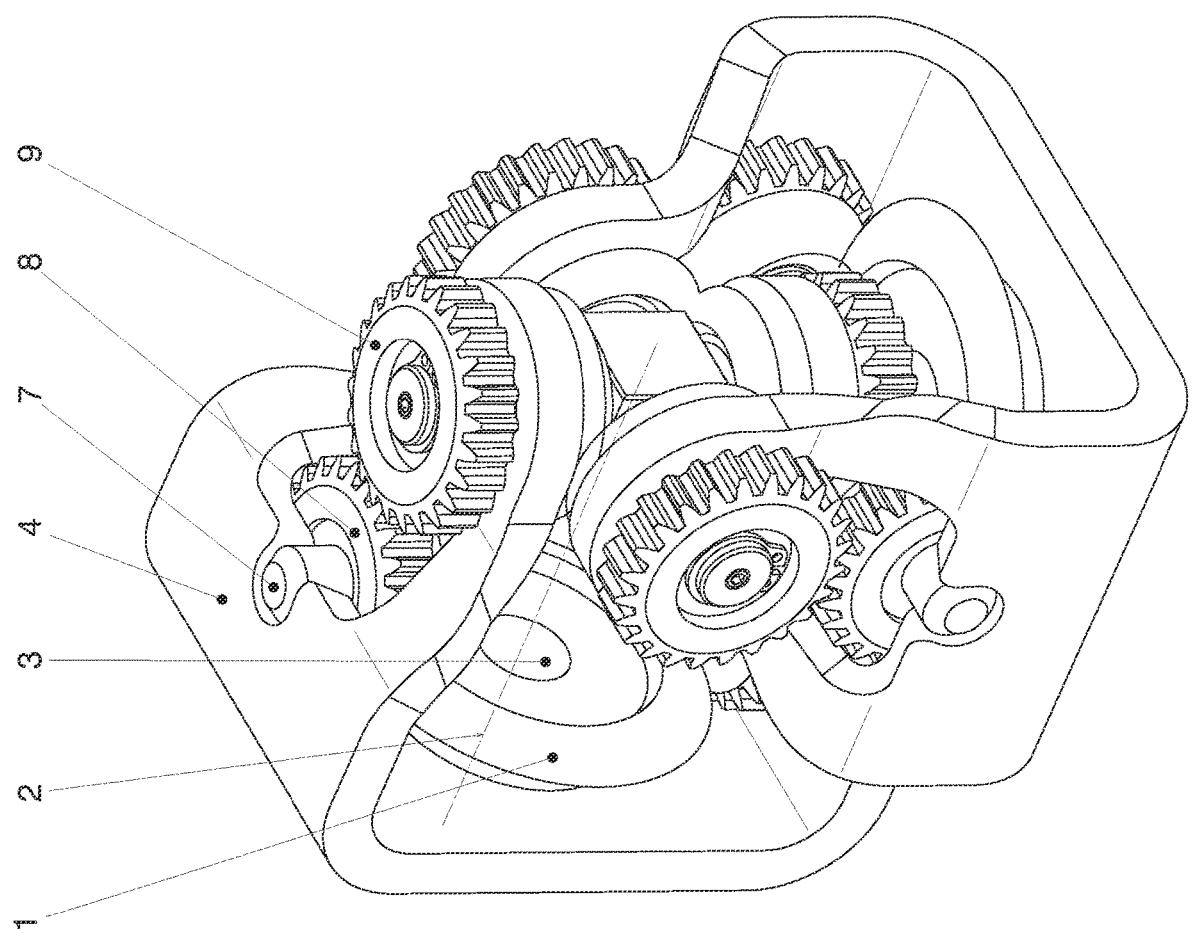
FIG. 6 is the isometric view of the 90°-joint transmission in the 90° position.

The 90°-joint transmission with spur- and bevel gears, as apparent in FIG. 1, is shown with two joint forks (4, 22) and connection bevel gears (1, 25). Depending on the application, the connection bevel gears (1, 25) can be designed with conventional connectors such as a flange or locking-pins.

The cross-axle 13 can be designed with through-holes, plugs and a grease fitting in order to provide sufficient lubrication at the bearing points. The 90°-joint transmission can also be surrounded by a grease-filled bellows. Thus, one achieves a permanent lubrication, protection against pollution, and protection against reaching into the gearing. In addition, the gearing can be carried out with a straight-, oblique- or spiral gearing.

The connection bevel gear 1 is rotatably mounted on the 1st bearing axle 2, connected to the joint fork 4, and drives the bevel gear 5 on the 2nd bearing axle 6. The bevel gear 5 is positively connected to the spur gear 8. These two gears are divided due to manufacturing and could also be made in one piece.

The spur gear 8 on the 2nd bearing axle 6 drives the spur gear 9 on the 3rd bearing axle 10. Via the spur gear 9, the power transmission is positively transmitted to the bevel gear 12. In this case, both gears (9, 12) are freely rotatably mounted on the 3rd bearing axle 10. The joint fork 4 has, per drive-train, 3 bearing axles, in order to be able to accommodate the respective bevel- and spur-gears, freely rotatably mounted. Thus, the joint fork 4 has a total of 5 bearing axles for both drive-trains. The two bevel gears 12 and 14 are in mutual engagement and are freely rotatable on the cross-axle 13. In this case, the power transmission takes place according to the diffraction angle up to max. 90° via the cross-axle 13 from the first to the second joint half.

The joint forks (4, 22) have a scaled fork to allow the installation of the cross-axle 13 in each joint fork (4, 22) of the fork inside.

The bevel gear 14 drives the spur gear 17 on the 3rd bearing axle 15. In this case, the spur gear 17 and the bevel gear 14 are positively connected to each other, wherein both gears are freely rotatably mounted on the 3rd bearing axle 15. The spur gear 17 on the 3rd bearing axle 10 drives the spur gear 18 on the 2nd bearing axle 20. The spur gear 18 is positively connected to the bevel gear 21. The bevel gear 25 is rotatably mounted on the 2nd bearing axle 20, connected to joint fork 22 and drives the connection bevel gear 25 on the 1st bearing axle 23.

The torque and speed transmission is available, at any diffraction angle up to max. 90°, consistently from the driving-to the joint half to be driven. For the sake of uniform load discharge into the joint forks (4, 22) and uniform distribution over each gearing, all bevel- and spur gear connections are also arranged on each opposite side, wherein the rotation direction of the opposite gear is naturally opposite.

The connection bevel gear 1, which is connected to the joint fork 4 on the 1st bearing axle 2, drives the two bevel gears 5 on the 2nd bearing axle 6. Wherein a bevel gear 5 is driven forward and the opposite bevel gear is driven in the opposite direction. Each of the two bevel gears 5 is fixedly connected to a spur gear 8. Each spur gear 8 on the 2nd bearing axle 6 drives each spur gear 9 on the 3rd bearing axle 10, each side with opposite rotation direction. Via each 3rd bearing axle 10 and 15 of the cross-axle 13, the power transmission is carried out from one joint half to the other joint half.

The two bevel gears 12 and 14 are mutually engaged, as well as each opposite bevel gears. Thus, there are a total of 4 bevel gears on the cross-axle 13, of which in each case the opposite bevel gear naturally has an opposite rotation direction. In this case, the power transmission takes place from the first to the second joint half, according to the diffraction angle up to max. 90°

The bevel gear 14 and the bevel gear opposite thereto drive together each of the two spur gears 17 on the 3rd bearing axle 15. The spur gears 17 and the bevel gears 14 are fixedly connected to each other, wherein both gears are freely rotatably mounted on each joint fork in the 3rd bearing axle 15. The spur gear 17 on the 3rd bearing axle 10 drives the spur gear 18 on the 2nd bearing axle 20, as well as in the opposite rotation, the spur gear opposite thereto of the other joint fork. The spur gear 18 is fixedly connected to the bevel gear 21. Both bevel gears 25 are rotatably mounted on the 2nd bearing axle 20 with the joint fork 22, and drive together the connection bevel gear 25 on the 1st bearing axle 23. In this case, the bevel gear 21 drives forward and the opposite bevel gear naturally in the opposite rotation direction.

LIST OF REFERENCE NUMBERS FOR 90°-JOINT TRANSMISSION

For the first joint half:
1. connection bevel gear
2. 1st bearing axle
3. 1st bearing
4. joint fork
5. bevel gear
6. 2nd bearing axle
7. 2nd bearing
8. spur gear
9. spur gear
10. 3rd bearing axle
11. 3rd bearing (cross-axle)
12. bevel gear For connection of both joint halves:
cross-axle For the 2nd joint half:
13. bevel gear
14. 3rd bearing axle
15. 3rd bearing (cross-axle)
16. spur gear
17. spur gear
18. 2nd bearing
19. 2nd bearing axle
20. bevel gear
21. joint fork
22. 1st bearing axle
23. 1st bearing
24. connection bevel gear

The invention claimed is:

1. A geared universal joint for connecting a pair of shafts, comprising:
two joint forks with rotatably mounted bevel- and spur gear pairs for the positive transmission of a rotational movement at an angular offset of the pair of shafts or variable diffraction angle between the pair of shafts up to 90°, wherein each joint fork (4, 22) comprises a connection bevel gear (1, 25) with a coaxial recess disposed at a front of the joint fork, wherein in each joint fork (4, 22) a 1st bearing (3, 24) accommodates the connection bevel gears (1, 25), and a 2nd bearing (7, 19) accommodates first bevel gears (5, 21) and first spur gears (8, 18), further a 3rd bearing (11, 16) accommodates second spur gears (9, 17), which are in turn connected to second bevel gears (12, 14), and the second bevel gears (12, 14) are mutually engaged with each other via a cross-axle (13), hinged, and each are freely rotatably connected, and in each joint fork (4,22) the connection bevel gear (1, 25) is in mutual engagement with at least one first bevel gear (5, 21) and via a coaxial 1st bearing (3, 24) is free-rotationally connected to the joint fork (4, 22).

2. The geared universal joint according to claim 1, wherein the first bevel gear (5, 21) freely rotatable about the 2nd bearing (7, 19) on each joint fork (4, 22) is connected to a spur gear (8, 18) at right angle.

3. The geared universal joint according to claim 1, wherein the first spur gear (8, 18) in mutual engagement via the 3rd bearing (11, 16) on each joint fork (4, 22) is freely rotatably connected to the second spur gear (9, 17).

4. The geared universal joint according to claim 1, wherein the second spur gear (9, 17) freely rotatable about the 3rd bearing (11, 16) on each joint fork (4, 22) is connected to the second bevel gear (12, 14) coaxially on the 2nd bearing axle.

5. The geared universal joint according to claim 1, wherein each of the second bevel gears (12, 14) is freely rotatably mounted on the cross-axle (13) and is in mutual engagement with each other with at least one of the second bevel gears (12, 14) at right angles.

6. The geared universal joint according to claim 1, wherein the cross-axle (13) is rotatably connected to the two joint forks (4, 22), coaxially rotated by 90° to each other, and the two joint halves are freely rotatably held together with a diffraction angle of max 90°.

7. The geared universal joint according to claim 6, wherein the joint fork (4, 22) M a drive-train has a total of three bearing axles, of which the 1st bearing axle (2, 23) is coaxially connected to the connection bevel gear (1, 25), the 2nd bearing axle (6, 20) is provided for the coaxial accommodation of the first bevel gears (5, 21) with first spur gears (8, 18), the 3rd bearing axle (10, 15) coaxially accommodates the second spur gears (9, 17) and the second bevel gears (12, 14), and the 2nd bearing axle (6, 20) next to the 3rd bearing axle (10, 15) is respectively perpendicular to the 1st bearing axle (2, 23).

8. The geared universal joint according to claim 6, wherein the joint forks (4, 22) have a scaled fork to allow the installation of the cross-axle 13 in respective joint forks (4, 22) of an inner fork side.

9. The geared universal joint according to claim 1, wherein the cross-axle (13) at its ends is adapted for the accommodation of each one of second bevel gears (12, 14) and second spur gears (9, 17), of which adjacent second bevel gears (12, 14) are in mutual engagement with each other, and thereby respectively axially opposite second bevel gears (12, 14) rotate in opposite rotation directions.

* * * * *